(12) United States Patent
Saito et al.

(10) Patent No.: US 6,739,967 B2
(45) Date of Patent: May 25, 2004

(54) FUME HOOD MANAGEMENT SYSTEM

(75) Inventors: Hideya Saito, Tokyo (JP); Yoshihiro Aiiso, Tokyo (JP); Akio Matsumura, Tokyo (JP); Shota Yamada, Tokyo (JP); Nobuhide Honda, Tokyo (JP); Ken Amari, Tokyo (JP)

(73) Assignee: Yamatake Corporation, Tokyo (JP)

( * ) Notice: Subject to any disclaimer, the term of this patent is extended or adjusted under 35 U.S.C. 154(b) by 0 days.

(21) Appl. No.: 10/633,121

(22) Filed: Aug. 1, 2003

(65) Prior Publication Data

US 2004/0033774 A1 Feb. 19, 2004

(51) Int. Cl.$^7$ .............................................. B08B 15/02
(52) U.S. Cl. ........................................ 454/61; 454/56
(58) Field of Search ....................... 454/56, 61

(56) References Cited

U.S. PATENT DOCUMENTS 4,528,898 A  *  7/1985  Sharp et al. ................ 454/61

* cited by examiner

*Primary Examiner*—Harold Joyce
(74) *Attorney, Agent, or Firm*—Blakely, Sokoloff, Taylor & Zafman

(57) ABSTRACT

A fume hood management system includes a collection section and a server apparatus. The collection section collects data representing an operation state from a plurality of fume hoods. The server apparatus includes an arithmetic section. The arithmetic section calculates a simultaneous utilization ratio on the basis of the number of simultaneously used hoods and the total number of fume hoods. The number of simultaneously used hoods is obtained from the data collected by the collection section and represents the number of fume hoods that are being used.

9 Claims, 4 Drawing Sheets

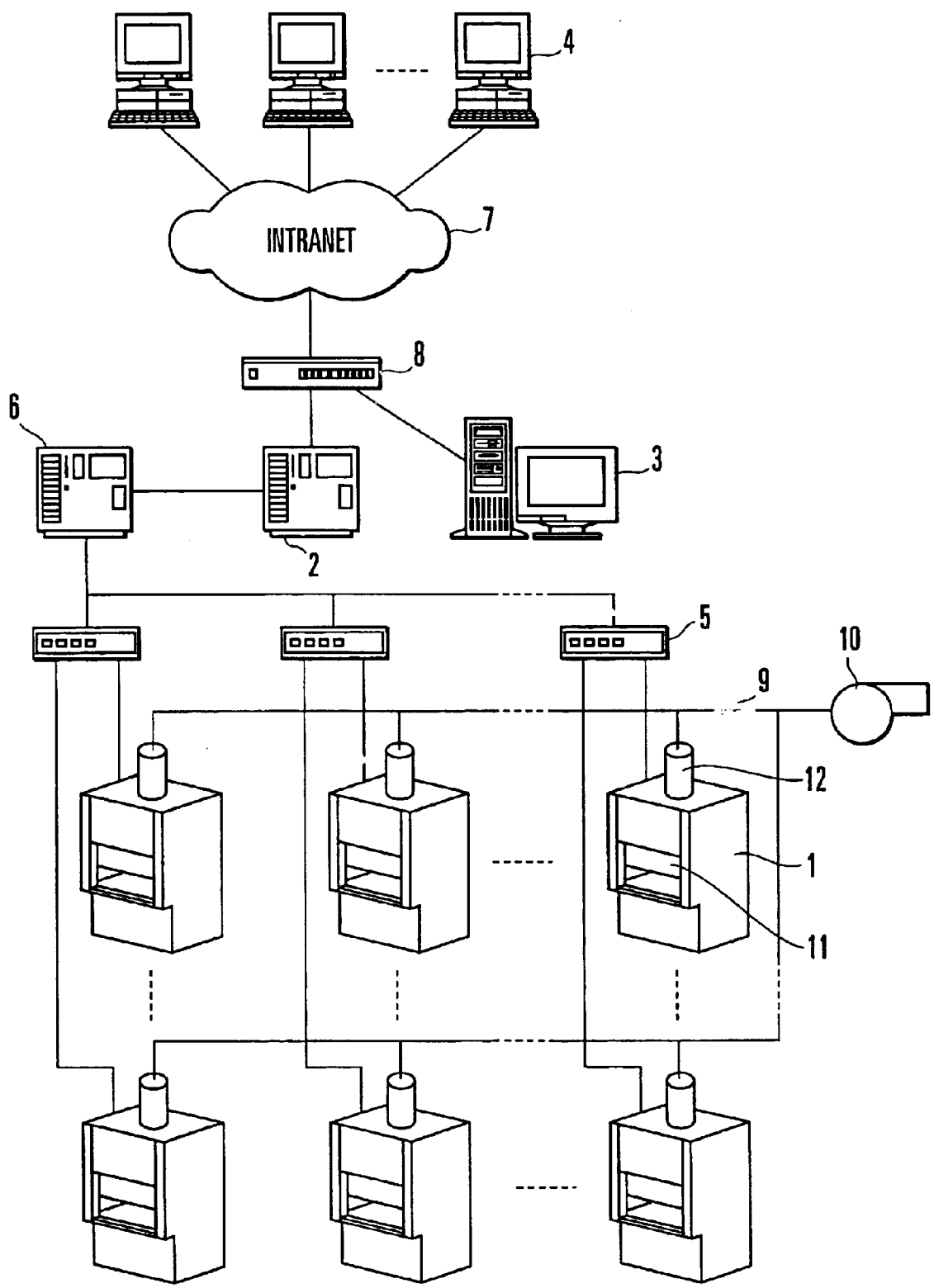
F I G. 1

FUME HOOD MANAGEMENT SYSTEM

BACKGROUND OF THE INVENTION

The present invention relates to a fume hood which locally exhausts toxic gases generated in an environment such as a research establishment, plant, or hospital, which is hazardous for workers or products and, more particularly, to a fume hood management system which can acquire data related to the safety of workers.

In chemical experiments, gases or dusts that are hazardous for human bodies are often generated in experimental working processes. One of apparatuses that prevent such hazardous substances from diffusing in a room and prevent contamination of human bodies is a fume hood. Generally, a fume hood has an envelope (enclosure) with a sash door that can be opened/closed vertically or horizontally. Workers of a laboratory can access the enclosure through the sash door.

To prevent workers who are working in the fume hood from being exposed to hazardous gases or dusts, the enclosure is connected to an exhaust apparatus for removing the hazardous substances.

As an exhaust control method for such an airflow control system having fume hoods and exhaust apparatus, a VAV (Variable Air Volume) method is known, which changes the exhaust airflow of the fume hood in accordance with the aperture ratio of the sash. In addition, a UBC (Usage Based Controls (tradename)) method is also known, which detects the presence/absence of workers, increases the exhaust airflow only when workers are present, and decreases the exhaust airflow if no workers are present.

In recent airflow control systems, "diversity" has been introduced as a technique for optimizing the system. The "diversity" is a system design concept based on a statistical value, i.e., a fact that as the simultaneous utilization ratio of fume hoods (the ratio of the number of fume hoods that are being used to the total number of fume hoods) converges to a predetermined value as the number of fume hoods increases.

According to this "diversity" concept, the design maximum exhaust airflow, i.e., the maximum airflow that can be exhausted by the exhaust apparatus can be decreased on the basis of the statistical value. Hence, the energy cost can be effectively reduced while safely operating laboratories.

However, the conventional airflow control systems have no means for measuring the simultaneous utilization ratio during an actual operation. The margin at the time of actual operation with respect to the simultaneous utilization ratio at the design stage cannot be confirmed.

The simultaneous utilization ratio at the time of actual operation changes depending on the facility where the fume hoods are installed. In fact, the simultaneous utilization ratio also changes depending on the scale of the facility and the number of workers. Hence, if the system is designed on the basis of only the statistical simultaneous utilization ratio, it cannot be determined whether the design is appropriate. To ensure sufficient safety, the design margin must be large.

Additionally, the conventional airflow control systems have neither means for measuring the maximum exhaust airflow, i.e., the sum of instantaneous exhaust airflows of the fume hoods nor means for measuring the safety margin, i.e., the difference between the design maximum exhaust airflow and the maximum exhaust airflow. Hence, the degree of safety or the facility allowance cannot be confirmed.

As a consequence, in the conventional airflow control systems, data related to the safety of workers, including the simultaneous utilization ratio at the time of actual operation and the safety margin, cannot be acquired. Hence, it is difficult to evaluate the safety of the system.

SUMMARY OF THE INVENTION

It is an object of the present invention to provide a fume hood management system which can acquire data related to the safety of workers.

In order to achieve the above object, according to the present invention, there is provided a fume hood management system comprising collection means for collecting data representing an operation state from a plurality of fume hoods, and a server apparatus which comprises arithmetic means for calculating a simultaneous utilization ratio on the basis of the number of simultaneously used hoods and the total number of fume hoods, the number of simultaneously used hoods being obtained from the data collected by the collection means and representing the number of fume hoods that are being used.

BRIEF DESCRIPTION OF THE DRAWINGS

FIG. 1 is a block diagram showing the arrangement of a fume hood management system according to an embodiment of the present invention;

DESCRIPTION OF THE PREFERRED EMBODIMENT

Figure 2A:
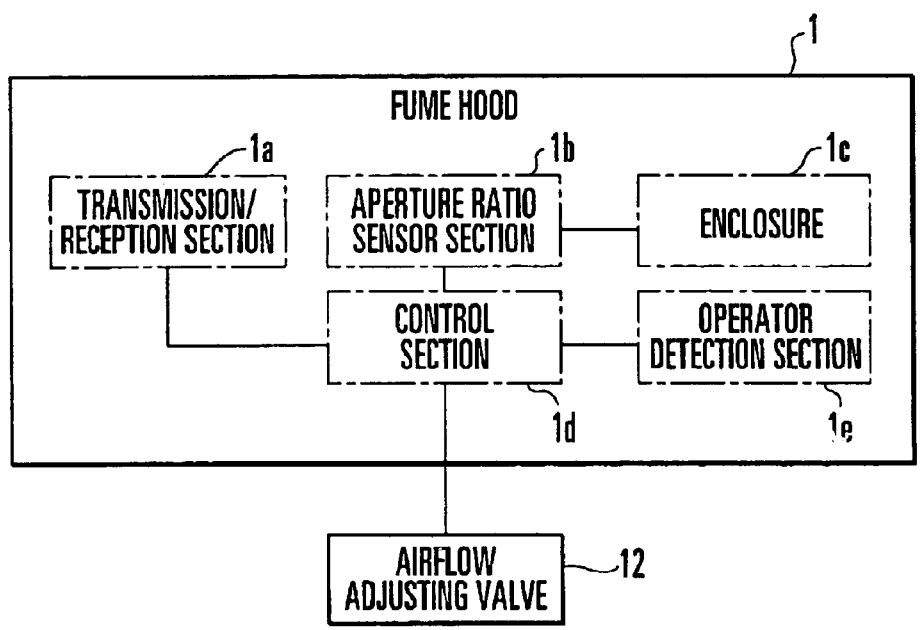
FIG. 2A is a block diagram showing the arrangement of a fume hood in the fume hood management system according to the embodiment of the present invention.

The embodiment of the present invention will be described below in detail with reference to the accompanying drawings.

As shown in FIG. 1, a fume hood management system according to the present invention comprises a plurality of fume hoods 1, a data collection module 2 serving as a collection means for collecting field data representing an operation state from each fume hood 1, and a server apparatus 3 serving as an arithmetic means for calculating the simultaneous utilization ratio or safety margin on the basis of the collected field data.

The fume hood management system according to this embodiment also comprises a plurality of terminal apparatuses 4 which display data transmitted from the server apparatus 3, routers 5 which connect the fume hoods 1 to a network, and a gateway apparatus 6 which connects the network to the data collection module 2.

The fume hood management system according to this embodiment also comprises an intranet 7 connected to the terminal apparatuses 4, and a router 8 which connects the server apparatus 3 to the intranet 7.

As shown in FIG. 2A, each fume hood 1 comprises a transmission/reception section 1a which transmits/receives field data representing an operation state, and a control section 1d which is connected to the transmission/reception section 1a and controls the respective sections.

The fume hood 1 also comprises an aperture ratio sensor section 1b which is connected to the control section 1d and detects and monitors the aperture ratio of the sash door prepared in an enclosure 1c (to be described later). The fume hood 1 also comprises the enclosure 1c which is connected to the aperture ratio sensor section 1b and has an envelope with, e.g., a movable sash door. The fume hood 1 also comprises an operator detection section 1e which is connected to the control section 1d and detects a worker (operator) in front of the fume hood 1. The control section is also connected to an airflow adjusting valve 12.

As the detection section 1e, various means such as an infrared sensor or camera can be used.

To determine whether the sash is open, the method of causing the sash aperture ratio sensor to directly detect the aperture ratio of the sash can be used. Alternatively, the sash open state may be determined by arithmetically obtaining the aperture ratio of the sash on the basis of a known maximum height of the sash and a sash position detected by a sash position sensor attached to a predetermined position.

It may also be determined that the sash is open when the control signal to the exhaust valve of the fume hood has a value equal to or larger than a predetermined set value (a value at which a predetermined airflow or more should be exhausted) or when the measurement value of an airflow sensor attached to a predetermined position exceeds a predetermined minimum exhaust airflow.

At least one of the aperture ratio sensor section 1b and detection section 1e suffices.

In the present invention, the "safety margin" means the degree of safety for workers and the facility allowance.

Figure 2B:
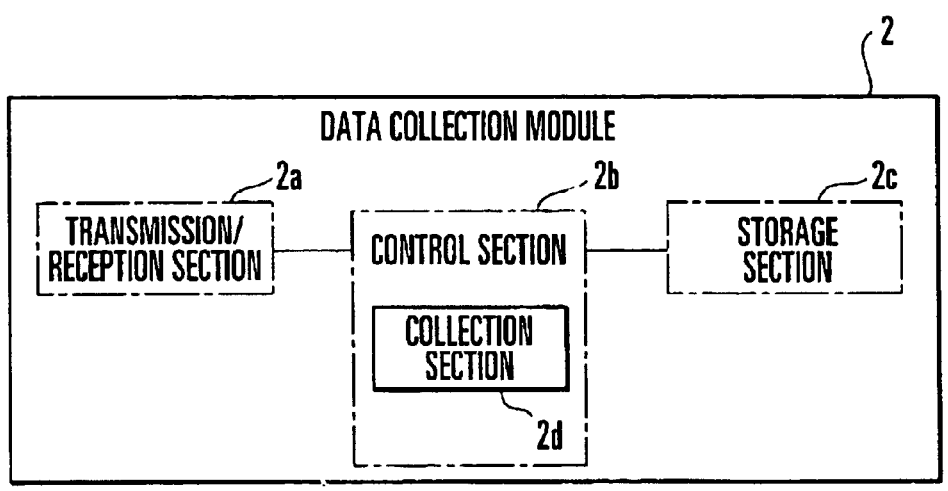
FIG. 2B is a block diagram showing the arrangement of a data collection module in the fume hood management system according to the embodiment of the present invention.

As shown in FIG. 2B, the data collection module 2 comprises a transmission/reception section 2a which receives field data representing an operation state, a control section 2b having a collection section 2d which is connected to the transmission/reception section 2a and collects the field data, and a storage section 2c which is connected to the control section 2b and stores the received data.

Figure 2C:
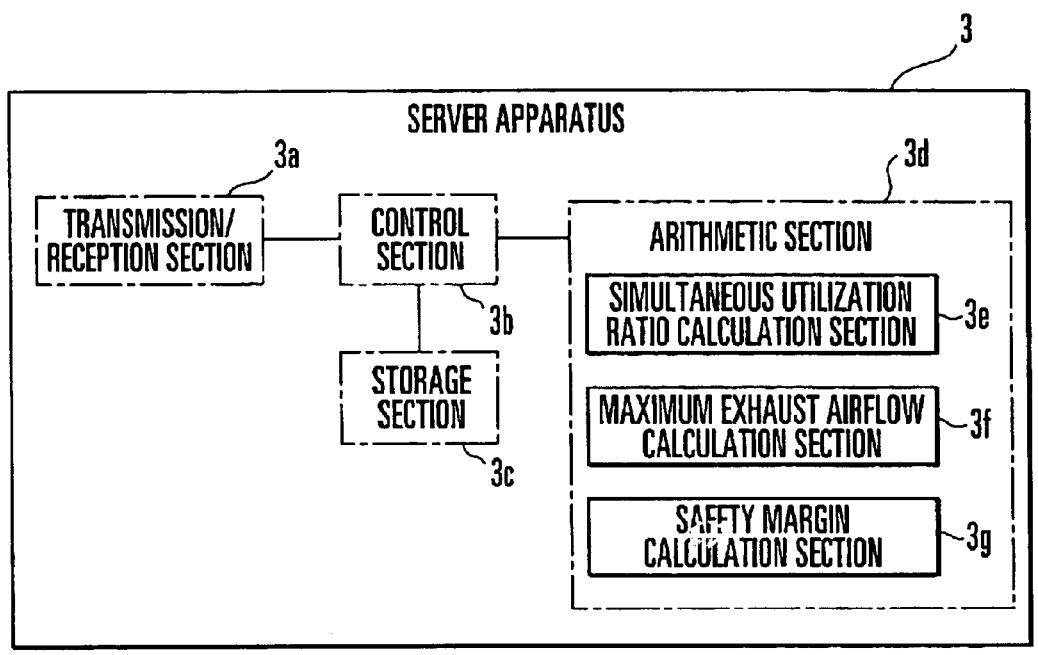
FIG. 2C is a block diagram showing the arrangement of a server apparatus in the fume hood management system according to the embodiment of the present invention.
Figure 2D:
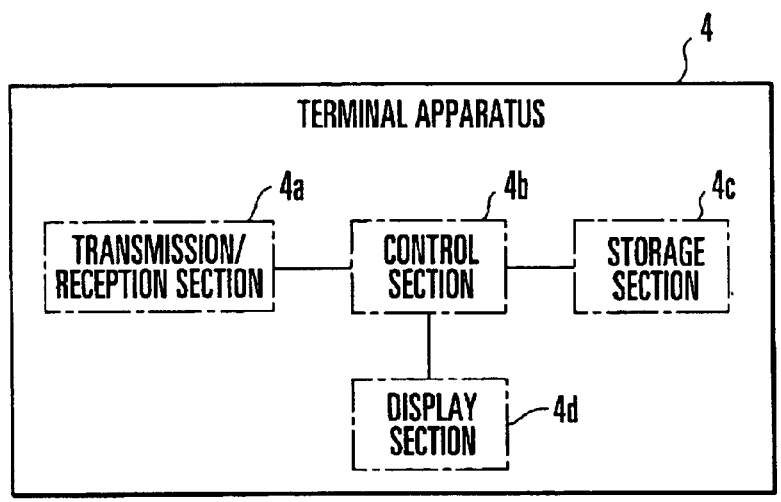
FIG. 2D is a block diagram showing the arrangement of a terminal apparatus in the fume hood management system according to the embodiment of the present invention.

As shown in FIG. 2C, the server apparatus 3 comprises a transmission/reception section 3a which receives data from the fume hood 1 and data collection module 2, and a control section 3b which is connected to the transmission/reception section 3a and controls the respective sections. The server apparatus 3 also comprises a storage section 3c which is connected to the control section 3b and stores arithmetic results. The server apparatus 3 also comprises an arithmetic section 3d which is connected to the control section 3b and includes a simultaneous utilization ratio calculation section 3e which calculates the simultaneous utilization ratio (to be described later), a maximum exhaust airflow calculation section 3f which calculates the maximum exhaust airflow, and a safety margin calculation section 3g which calculates the safety margin.

The terminal apparatus 4 comprises a transmission/reception section 4a which receives data from the server apparatus 3, and a control section 4b which is connected to the transmission/reception section 4a and controls the respective sections. The terminal apparatus 4 also comprises a display section 4d which is connected to the control section 4b and displays the received data, and a storage section 4c which stores the received data.

The operation of the fume hood management system will be described below.

When the VAV method is employed as the exhaust control method, the control section (control unit) 1d of each fume hood 1 changes the exhaust airflow by adjusting the airflow control valve 12 in accordance with the aperture ratio of a sash 11. For example, when the aperture ratio of the sash 11 is 20% or less, the control section 1d sets the minimum exhaust airflow. When the aperture ratio is 50%, the exhaust airflow is set to 50%. When the aperture ratio is 100%, the exhaust airflow is set to 100%.

When the UBC method is employed as the exhaust control method, the control section (control unit) 1d of each fume hood 1 causes the detection section 1e (detection sensor) installed in the fume hood 1 to confirm whether a worker (operator) is present in front of the fume hood 1. When a worker (operator) is present, the exhaust airflow is increased by adjusting the airflow control valve 12. When no worker is present, the exhaust airflow is decreased to a safe standby level.

The data collection module 2 periodically collects field data representing the operation state of each fume hood 1 from the control unit of the fume hood 1 through the gateway apparatus 6 and router 5.

Field data may contain only instantaneous exhaust airflows, instantaneous exhaust airflows and sash aperture ratios, or instantaneous exhaust airflows, sash aperture ratios, and detection results of detection sensors (the presence/absence of workers). The collectable field data changes depending on the form of the fume hood 1.

The server apparatus 3 stores the field data collected by the data collection module 2 in the internal storage section 3c (storage device). The server apparatus 3 also calculates the number of simultaneously used hoods, the simultaneous utilization ratio, the maximum exhaust airflow, and the safety margin every predetermined time on the basis of the field data.

All the fume hoods 1 shown in FIG. 1 are connected to a single exhaust system 9 so that exhaust is executed. An exhaust fan 10 is attached to the terminal of the exhaust system 9.

The number of simultaneously used hoods is the number of fume hoods 1 that are being used in a total number n (n is a natural number) of fume hoods 1 connected to the exhaust system 9.

The method of determining whether each fume hood 1 is being used changes depending on the type of field data that can be collected from the fume hood 1. The hood 1 whose sash 11 has an aperture ratio equal to or more than a set value may be determined as being used. Alternatively, the hood 1 whose exhaust airflow is equal to or more than a set value may be determined as being used.

The simultaneous utilization ratio is obtained by dividing the number of simultaneously used hoods by the total number n of fume hoods 1.

The maximum exhaust airflow is the sum of instantaneous exhaust airflows of the fume hoods 1 connected to the exhaust system 9. The safety margin is the difference between the maximum exhaust airflow and the design maximum exhaust airflow which is the maximum value of the airflow that can be exahusted by the exhaust system 9.

The design maximum exhaust airflow is a known value, as a matter of course.

The server apparatus 3 stores the calculated number of simultaneously used hoods, simultaneous utilization ratio, maximum exhaust airflow, and safety margin in the internal storage section 3c (storage device) as actual values.

The server apparatus 3 also calculates ideal values together with the actual values and stores the ideal values in the internal storage section 3c (storage device). The ideal values can be obtained when each fume hood 1 has the detection section 1e such as a detection sensor.

The ideal values are obtained by calculating the number of simultaneously used hoods, the simultaneous utilization ratio, the maximum exhaust airflow, and the safety margin while assuming that the hoods 1 whose sashes 11 are open although the detection sensors detect no workers are hoods that are not being used and have the minimum exhaust airflow.

The server apparatus 3 transmits, to the terminal apparatuses 4 through the router 8 and intranet 7, the design maximum exhaust airflow, the actual value and ideal value of the maximum exhaust airflow, the actual value and ideal value of the safety margin, the actual value and ideal value of the number of simultaneously used hoods, and the actual value and ideal value of the simultaneous utilization ratio.

The server apparatus 3 also transmits, to the terminal apparatuses 4 through the router 8 and intranet 7, a target exhaust airflow which is set in advance as the target value of reduction of the design maximum exhaust airflow, the actual value and ideal value of a target safety margin which is set in advance as the target value of the safety margin, and the actual value and ideal value of a target number of simultaneously used hoods, which is set in advance as the target value of the number of simultaneously used hoods.

The actual value of the target safety margin (target number of simultaneously used hoods) is obtained by defining the fume hoods 1 whose sash aperture ratios are equal to or more than a set value or whose exhaust airflows are equal to or more than a set value as being used, as described above.

The ideal values are obtained by defining that the hoods 1 whose sashes 11 are open although the detection sensors detect no workers have the minimum exhaust airflow.

Figure 3:
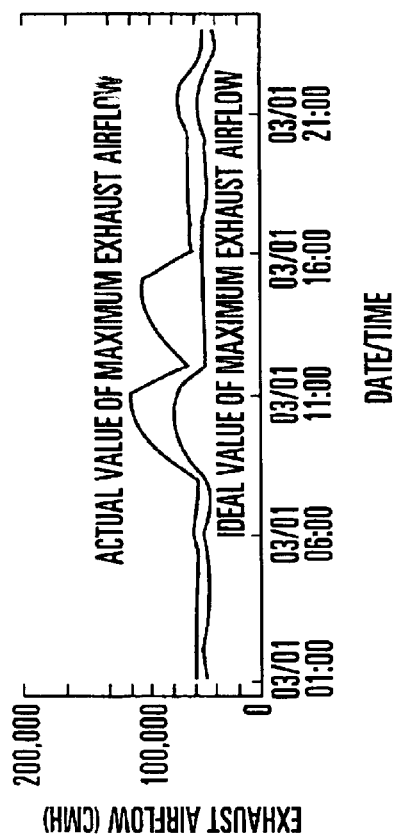
FIG. 3 is a view showing an example of data displayed on the screen of the terminal apparatus shown in FIG. 1.

Each terminal apparatus 4 connected to the intranet 7 is used by a manager who operates the fume hood management system shown in FIG. 1 or a worker who uses the fume hood 1. Each terminal apparatus 4 displays data received from the server apparatus 3 on the display section 4d. FIG. 3 shows an example of data displayed on the screen of the terminal apparatus 4.

In the example shown in FIG. 3, the design maximum exhaust airflow, the actual value and ideal value of the maximum exhaust airflow, the actual value and ideal value of the safety margin, the actual value and ideal value of the number of simultaneously used hoods, the actual value and ideal value of the simultaneous utilization ratio, the target exhaust airflow, the actual value and ideal value of the target safety margin, and the target number of simultaneously used hoods are displayed as numerical values that represent safety indices.

The maximum exhaust airflow, the safety margin, the number of simultaneously used hoods, and the simultaneous utilization ratio are calculated and transmitted by the server apparatus 3 every predetermined time. For this reason, their display values are updated at all times.

In the example shown in FIG. 3, the actual value and ideal value of the maximum exhaust airflow which changes over time are indicated by graphs. When the actual value of the safety margin exceeds the actual value of the target safety margin, the server apparatus 3 calculates the elapsed time from the start to the end of the excess as the actual value of a target safety margin excess time. When the ideal value of the safety margin exceeds the ideal value of the target safety margin, the server apparatus 3 calculates the elapsed time of the excess as the ideal value of the target safety margin excess time, like the actual value.

When the actual value of the number of simultaneously used hoods exceeds the actual value of the target simultaneous utilization ratio, which is obtained from the actual value of the target number of simultaneously used hoods, the server apparatus 3 calculates the elapsed time from the start to the end of the excess as the actual value of a target simultaneous utilization ratio excess time.

When the ideal value of the number of simultaneously used hoods exceeds the ideal value of the target simultaneous utilization ratio, which is obtained from the ideal value of the target number of simultaneously used hoods, the server apparatus 3 calculates the elapsed time of the excess as the ideal value of the target simultaneous utilization ratio excess time, like the actual value.

The server apparatus 3 transmits, to the terminal apparatuses 4, the calculated actual value and ideal value of the target safety margin excess time and the actual value and ideal value of the target simultaneous utilization ratio excess time. Each terminal apparatus 4 displays the received data.

In this embodiment, the data collection module 2 and server apparatus 3 are separately arranged. However, they may be integrated into one management apparatus. The routers 5, gateway apparatus 6, and router 8 are not always necessary. The arrangement can be appropriately changed in accordance with the network condition of each facility.

As described above, in this embodiment, field data is collected from each fume hood 1, and the simultaneous utilization ratio and safety margin are obtained. Accordingly, quantitative numerical data related to the safety of workers can be acquired, and the safety of the system can be evaluated.

In addition, the margin of the system with respect to the current rating of the exhaust fan 10 can be confirmed on the basis of the data. Hence, how many fume hoods 1 can be added in modifying the facility, or whether the number of exhaust fans 10 must also be increased when the fume hoods needs to be added can be appropriately determined.

According to the present invention, data representing the operation state is collected from each fume hood 1. The number of simultaneously used hoods, i.e., the number of fume hoods that are being used is calculated on the basis of the data. When the number of simultaneously used hoods is divided by the number of fume hoods, the simultaneous utilization ratio can be calculated. Data to be used to determine whether the design is appropriate or quantitative numerical data related to the safety of workers can be acquired. It can be confirmed on the basis of the numerical data whether each fume hood is operating safely.

Measures necessary for a safer operation can be quantitatively grasped, and the quantitative numerical data as the basis of education to the safety can be presented to workers and the like who use the fume hoods. In addition, the calculated simultaneous utilization ratio can be used as basic data in modifying the facility.

The simultaneous utilization ratio is calculated by defining fume hoods whose detection sensors detect no workers and whose sashes are open as fume hoods that are not being used. By using thus calculated simultaneous utilization ratio as an ideal value, the decrease in simultaneous utilization ratio when workers close the sashes of the unused fume hoods can be confirmed, and the quantitative numerical data as the basis of education to the safety can be presented to workers and the like.

Data representing an operation state is collected from each fume hood 1. The maximum exhaust airflow, i.e., the sum of instantaneous exhaust airflows of the fume hoods is calculated on the basis of the data. Accordingly, the safety margin, i.e., the difference between the design maximum exhaust airflow and the maximum exhaust airflow can be calculated, and quantitative numerical data related to the safety of workers can be acquired. Furthermore, whether each fume hood is operating safely can be confirmed from the numerical data.

Moreover, measures necessary for a safer operation can be quantitatively grasped, and the quantitative numerical data as the basis of education to the safety can be presented to workers and the like who use the fume hoods. In addition, the calculated safety margin can be used as basic data in modifying the facility.

The safety margin is calculated by assuming that the exhaust airflows of fume hoods whose detection sensors detect no workers and whose sashes are open equal a predetermined minimum exhaust airflow. By using thus calculated safety margin as an ideal value, the increase in safety margin when workers close the sashes of the unused fume hoods can be confirmed, and the quantitative numerical data as the basis of education to the safety can be presented to workers and the like.

What is claimed is:

1. A fume hood management system comprising:
    collection means for collecting data representing an operation state from a plurality of fume hoods; and
    a server apparatus which comprises arithmetic means for calculating a simultaneous utilization ratio on the basis of the number of simultaneously used hoods and the total number of fume hoods, the number of simultaneously used hoods being obtained from the data collected by said collection means and representing the number of fume hoods that are being used.

2. A system according to claim 1, further comprising a plurality of fume hoods each of which comprises monitor means for monitoring the operation state.

3. A system according to claim 1, wherein the arithmetic means calculates the simultaneous utilization ratio by dividing the number of simultaneously used hoods by the total number of fume hoods.

4. A system according to claim 2, wherein
    said monitor means comprises operator detection means for detecting a presence of an operator, and
    said arithmetic means calculates the simultaneous utilization ratio by defining fume hoods whose operator detection means detect no operators and whose sashes are open as fume hoods that are not being used, and sets the calculated simultaneous utilization ratio as an ideal value.

5. A system according to claim 1, wherein
    said arithmetic means comprises
        maximum exhaust airflow calculation means for calculating a maximum exhaust airflow as a sum of instantaneous exhaust airflows of said fume hoods on the basis of the collected data, and
        safety margin calculation means for calculating a safety margin as a difference between the maximum exhaust airflow and a design maximum exhaust airflow which represents a maximum exhaust airflow that can be exahusted by an exhaust system connected to said plurality of fume hoods.

6. A system according to claim 5, wherein said arithmetic means calculates the safety margin by assuming that exhaust airflows of fume hoods whose operator detection means detect no operators and whose sashes are open equal a predetermined minimum exhaust airflow, and sets the safety margin as an ideal value.

7. A system according to claim 1, further comprising a terminal apparatus which is connected to said server apparatus through a communication network and comprises display means for displaying an arithmetic result by said arithmetic means.

8. A system according to claim 1, wherein said server apparatus comprises said data collection apparatus and said arithmetic means.

9. A system according to claim 2, wherein
    said fume hood comprises
        an enclosure having a movable sash, and
        aperture ratio sensor means for detecting an aperture ratio of the sash.

* * * * *